(12) United States Patent
Busatta et al.

(10) Patent No.: US 12,516,490 B2
(45) Date of Patent: Jan. 6, 2026

(54) MULTILAYER MEMBRANE FOR CONSTRUCTION

(71) Applicant: TEMA TECHNOLOGIES AND MATERIALS SRL, Vittorio Veneto (IT)

(72) Inventors: Nicola Busatta, Conegliano (IT); Federico Cais, San Vendemiano (IT); Katia Bortolin, Refrontolo (IT)

(73) Assignee: TEMA TECHNOLOGIES AND MATERIALS SRL, Vittorio Veneto (IT)

( * ) Notice: Subject to any disclaimer, the term of this patent is extended or adjusted under 35 U.S.C. 154(b) by 180 days.

(21) Appl. No.: 17/417,594

(22) PCT Filed: Jan. 15, 2020

(86) PCT No.: PCT/IB2020/050289
§ 371 (c)(1),
(2) Date: Jun. 23, 2021

(87) PCT Pub. No.: WO2020/148662
PCT Pub. Date: Jul. 23, 2020

(65) Prior Publication Data
US 2022/0056660 A1    Feb. 24, 2022

(30) Foreign Application Priority Data
Jan. 18, 2019   (IT) .................. 102019000000819

(51) Int. Cl.
*E02D 31/00*   (2006.01)
*B32B 27/08*   (2006.01)
(Continued)

(52) U.S. Cl.
CPC ............ *E02D 31/008* (2013.01); *B32B 27/08* (2013.01); *B32B 27/306* (2013.01); *B32B 27/32* (2013.01);
(Continued)

(58) Field of Classification Search
CPC ..... E02D 31/008; E02D 31/02; E02D 31/025; E02D 2300/0009; E02D 2300/001;
(Continued)

(56) References Cited

U.S. PATENT DOCUMENTS 4,956,951 A  *  9/1990  Kannankeril ........... E02D 31/02
                                                       405/36
4,994,328 A      2/1991  Cogliano
(Continued)

FOREIGN PATENT DOCUMENTS

| EP | 0 723 570 A1 | 7/1996 |
| GB | 2 340 070 A | 2/2000 |
| WO | WO 95/10574 A1 | 4/1995 |

OTHER PUBLICATIONS

International Search Report issued on Mar. 2, 2020 in PCT/IB2020/050289 filed on Jan. 15, 2020.
(Continued)

*Primary Examiner* — John D Freeman
(74) *Attorney, Agent, or Firm* — Oblon, McClelland, Maier & Neustadt, L.L.P.

(57) ABSTRACT

A multilayer membrane may be suitable for construction, and/ir adapted to be installed between a wall of a seat obtained in the ground and a concrete structure. The multilayer membrane may include: a first layer including thermoplastic polymeric material, impermeable or substantially impermeable to water; a second layer including thermoplastic polymeric material, impermeable or substantially impermeable to methane gas and/or radon gas and/or volatile
(Continued)

organic compounds (VOC), fixed to the first layer and adapted to be positioned, when the membrane is installed, between the first layer and a concrete structure.

17 Claims, 3 Drawing Sheets

(51) Int. Cl.
*B32B 27/30* (2006.01)
*B32B 27/32* (2006.01)
*B32B 27/34* (2006.01)
*B32B 27/36* (2006.01)
*E02D 31/02* (2006.01)

(52) U.S. Cl.
CPC .............. *B32B 27/34* (2013.01); *B32B 27/36* (2013.01); *E02D 31/02* (2013.01); *E02D 31/025* (2013.01); *B32B 2250/24* (2013.01); *B32B 2307/7242* (2013.01); *B32B 2307/7265* (2013.01); *B32B 2419/00* (2013.01); *E02D 2300/0009* (2013.01); *E02D 2300/001* (2013.01); *E02D 2300/0015* (2013.01); *E02D 2300/0017* (2013.01); *E02D 2300/0025* (2013.01)

(58) Field of Classification Search
CPC .... E02D 2300/0015; E02D 2300/0017; E02D 2300/0025; B32B 27/08; B32B 27/306; B32B 27/32; B32B 27/34; B32B 27/36; B32B 2250/24; B32B 2307/7242; B32B 2307/7265; B32B 2419/00; B32B 2307/30; B32B 7/02; B32B 7/12
See application file for complete search history.

(56) References Cited

U.S. PATENT DOCUMENTS

| 5,496,615 | A | 3/1996 | Bartlett et al. | |
|---|---|---|---|---|
| 6,676,780 | B1* | 1/2004 | Shahar | B32B 27/08 52/409 |
| 2001/0017431 | A1 | 8/2001 | Pip et al. | |
| 2005/0210772 | A1* | 9/2005 | Janesky | E02D 31/02 52/168 |
| 2006/0051558 | A1 | 3/2006 | Sieber et al. | |
| 2009/0159177 | A1* | 6/2009 | Muncaster | E02D 31/02 156/235 |
| 2016/0243800 | A1* | 8/2016 | Kolbasuk | B32B 27/08 |
| 2016/0361740 | A1* | 12/2016 | Xing | B01D 1/00 |

OTHER PUBLICATIONS

Combined Russian Office Action and Search Report issued Jan. 31, 2023, in corresponding Russian Patent Application No. 2021118412/05(038734) (with English Translation of Category of Cited Documents), 7 pages.

* cited by examiner

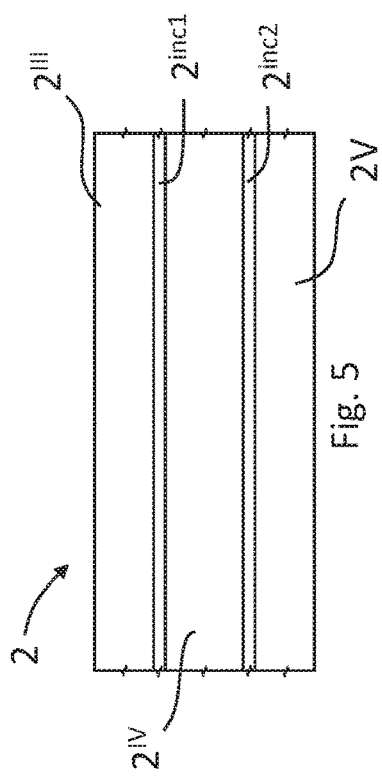
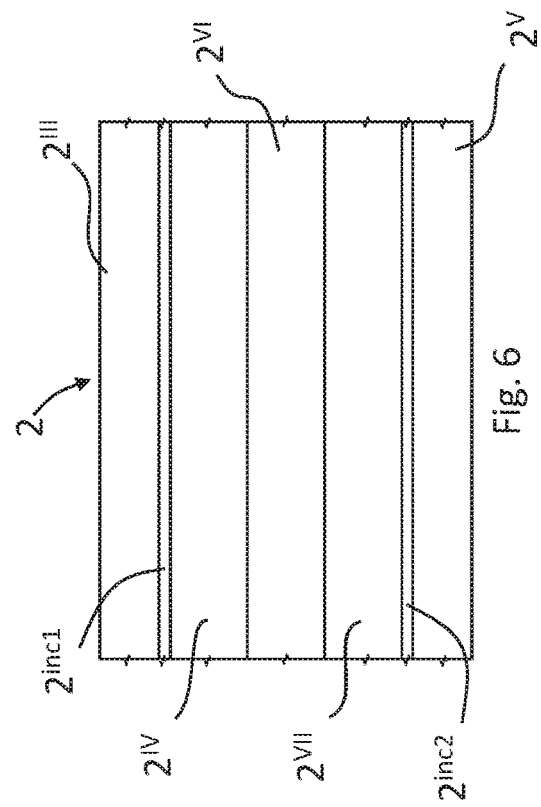
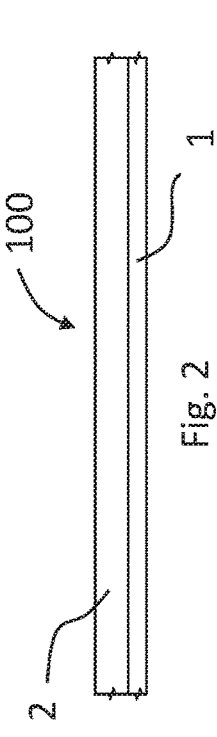
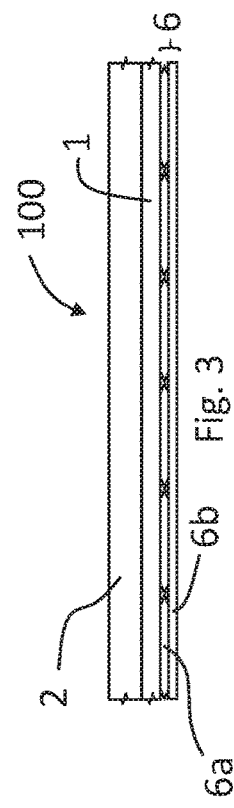
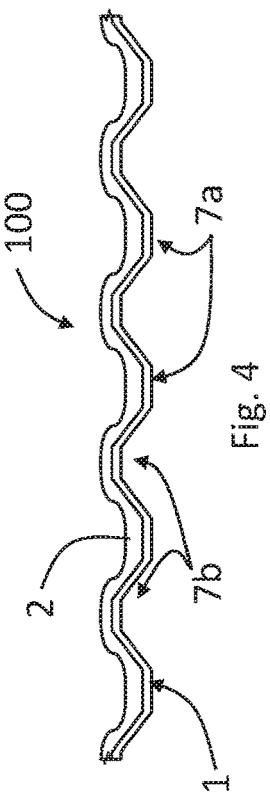

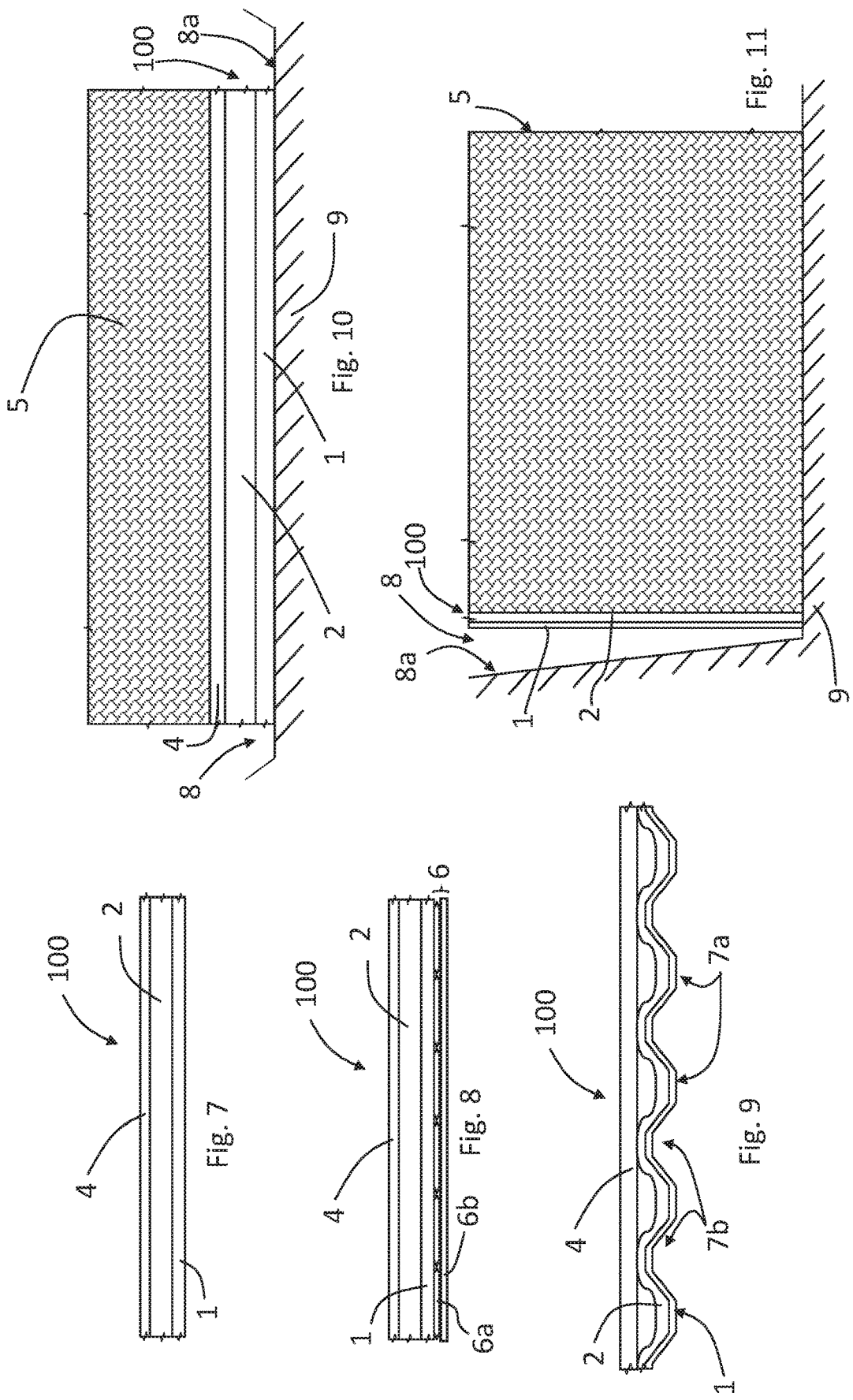

MULTILAYER MEMBRANE FOR CONSTRUCTION

CROSS-REFERENCE TO RELATED APPLICATIONS

The present application is the national stage of international application PCT/IB2020/050289, filed on Jan. 15, 2020, and claims the benefit of the filing date of Italian Appl. No. 102019000000819, filed on Jan. 18, 2019.

The present invention relates to a multilayer membrane for construction.

In construction, today, it is known to isolate the foundations of concrete structures from the ground in which these foundations are laid, by means of membranes impermeable to water.

The use of these impermeable membranes prevents the humidity present in the ground from reaching the concrete and from rising up, for example through cracks or slits present in it, creating dangerous infiltrations that might compromise the concrete structure.

A first known solution provides for casting the concrete structure directly onto the ground, generally by using special formworks, and then, once the concrete has solidified, positioning a membrane impermeable to water around the base of this structure, before burying it, so that the membrane is interposed between the ground and the side surface of the base, preventing possible water present in the ground from infiltrating into the concrete.

However, this solution of the known type is not suitable for use when the space available on the side of the concrete structure is limited.

A second solution of the known type provides for digging a seat in the ground, preparing a formwork in which to cast the concrete, covering the walls of the seat, and possibly part of the formwork, with an impermeable membrane, and pouring a concrete casting on this membrane which, once solidified, will constitute the base of the structure.

Once the concrete has solidified, the impermeable membrane remains fixed externally thereto, thus completely isolating the base of the structure from the ground. This second known solution provides for the use of particular membranes that are impermeable to water which comprise, on the face turned towards the concrete, means for fixing them to the same during its solidification.

Membranes of the known type used for this purpose are described, for example, in patent EP0723570B1, and in patent application GB2340070A.

These documents describe multilayer membranes provided, on the layer turned towards the concrete, with means for allowing the fixing of the concrete to the membrane, such as an adhesive (EP0723570B1) and a reticular structure in which the concrete penetrates and clings during the solidification phase (GB2340070A).

Such membranes of the known type, however, do not guarantee sealing against possible gases present in the ground, such as methane, radon, volatile organic compounds (VOC), which might rise up from the ground and, passing into possible cracks or slits present in the concrete, contaminate the concrete structure. Membranes for construction are known, typically used only to laterally cover the base of concrete structures cast directly onto the ground, which offer both a function of impermeability to water and protection from radon.

Such membranes of the known type comprise a polyethylene layer, which provides impermeability to water, coupled, by means of an adhesive, to an aluminum layer, which provides impermeability to radon. Such a membrane of the known type is for example marketed under the "Bituthene MRX" brand.

However, these membranes of the known type have some problems; first of all, the usage of an aluminum layer bonded to a polyethylene one makes them difficult to dispose or to recycle, since it is very difficult, if not impossible, to remove the polyethylene layer from the aluminum.

Furthermore, by using an aluminum layer, such membranes of the known type are rather expensive.

Again due to the presence of aluminum, these membranes of the known type are also not very flexible, which makes their installation difficult, in particular on uneven surfaces.

The main task of the present invention is therefore that of obviating the above mentioned drawbacks, and in particular that of obtaining a membrane for construction that can be interposed between the ground and a concrete structure to protect concrete from water and gases possibly present in the ground, and which can be, at least for the most part thereof, easily recycled.

Within the scope of this task, another object of the invention is to obtain a membrane which has a relatively low cost.

A further object of the invention is to provide a membrane whose installation is relatively easy. Still another object is to realise a membrane which can also be used in the presence of uneven surfaces.

These and other objects according to the present invention are achieved by realising a multilayer membrane for construction, adapted to be installed between a wall of a seat obtained in the ground and a concrete structure, which comprises:

- a first layer of thermoplastic polymeric material, impermeable or substantially impermeable to water;
- a second layer of thermoplastic polymeric material, impermeable or substantially impermeable to methane gas and/or radon gas and/or volatile organic compounds (VOC), fixed to the first layer and adapted to be positioned, when the membrane is installed, between the first layer and a concrete structure.

It should be noted that in this document saying that a layer is "substantially impermeable" at a certain substance (for example water or a gas), means saying that this layer has a degree of impermeability such that it allows, at most, the passage of very reduced quantities of this substance that are practically nil, or in any case not significant for the reason for which the passage of this substance must be prevented.

It should also be noted that, being made entirely of thermoplastic polymeric material, the membrane according to the invention is completely, or substantially totally, recyclable, since it can be dissolved and transformed, for example, into recycled polymer "pellets", which can be used for the molding of further products (for example also of further membranes).

It should be noted that the ease of recyclability of the membrane according to the invention is particularly advantageous both for the disposal thereof, for example once the concrete structure to which it is applied must be dismantled, and for reducing material waste, and the consequent environmental impact, in the event that the membrane or part thereof is defective or damaged, and therefore cannot be used (in which case it can therefore be easily recycled). The fact of being made entirely of thermoplastic material makes the membrane according to the invention relatively flexible, which facilitates its installation and allows the use thereof even on uneven contact surfaces.

Advantageously, the second layer has a thickness comprised between 0.05 mm and 0.3 mm.

Preferably, the first layer and the second layer are made, at least at their contact surfaces, of the same material, or of materials whose chemical composition allows its union by fusion.

More preferably, the first layer and the second layer are made, at least at their contact surfaces, of materials having substantially the same fusion temperature.

More preferably, the second layer is fixed to the first layer before the latter has completely cooled down, so that there is at least a partial fusion of the contact surfaces between the two.

The fixing between first and second layer by thermal effect by at least partial fusion of the two, ensures a perfect adhesion and mechanical seal between the two layers, without the need to use, for example, adhesives or adhesive layers, which would increase the cost, the thickness, and the weight of the membrane, and would make it less easily recyclable.

Preferably, the first layer is made of polyethylene (PE) or polyolefin mixture.

Advantageously, the first layer has a thickness comprised between 0.5 and 2 mm.

In a preferred embodiment, the second layer 2 has a permeability to methane gas lower than 40 $cm^3/(24\ h*m^2*atm)$ and/or a permeability to radon gas lower than 10 $cm^3/24\ h*m^2*atm)$.

In a preferred embodiment, the second layer has a multilayer structure, and comprises:
- a third layer of thermoplastic polymeric material, impermeable or substantially impermeable to water;
- a fourth layer of thermoplastic polymeric material impermeable or substantially impermeable to methane gas and/or to radon gas and/or volatile organic compounds (VOC), positioned between the third layer and the first layer;
- a fifth layer of thermoplastic polymeric material impermeable or substantially impermeable to water, positioned between the fourth layer and the first layer.

Advantageously, the fifth layer is fixed directly to the first layer.

Preferably, the fifth layer is made of the same material as the first layer or of a material whose composition allows its union by fusion with the first layer.

Advantageously, the fifth layer is made of a material having substantially the same fusion temperature as the first layer.

Preferably, the fifth layer is fixed to the first layer by, at least partial, fusion of the fifth layer and the first layer.

Preferably, the third layer is made of polyethylene (PE).

Preferably, the fourth layer is made of polyamide (PA), or polyethylene terephthalate (PET), or polyvinyl ethylene-alcohol (EVOH).

Preferably, the fifth layer is made of low density polyethylene (LDPE), or linear low density polyethylene (LLDPE), or high density polyethylene (HDPE).

In a preferred embodiment, the third layer has a thickness comprised between 0.020 and 0.145 mm.

Advantageously, the fourth layer has a fusion temperature higher than that of the fifth layer.

Preferably, the fourth layer has a fusion temperature higher than 135° C.

More preferably, the fourth layer has a fusion temperature comprised between 160° C. and 200° C.

Even more preferably, the fourth layer has a fusion temperature comprised between 165° C. and 191° C.

Preferably, the fifth layer has a thickness comprised between 0.020 and 0.145 mm.

Advantageously, the fifth layer has a fusion temperature from 100° C. to 135° C.

In a preferred embodiment, the membrane comprises a sixth layer of thermoplastic polymeric material impermeable or substantially impermeable to methane gas and/or radon gas and/or volatile organic compounds (VOC), interposed between the fourth layer and the fifth layer.

Advantageously, the sixth layer is made of polyvinyl ethylene-alcohol (EVOH).

Preferably, the sixth layer has a thickness comprised between 0.003 mm and 0.006 mm.

In a preferred embodiment, the membrane comprises a seventh layer of thermoplastic polymeric material impermeable or substantially impermeable to methane gas and/or radon gas and/or volatile organic compounds (VOC), interposed between the sixth layer and the fifth layer.

Preferably the seventh layer has the same composition as the fourth layer.

Advantageously, the seventh layer has a fusion temperature higher than that of the fifth layer.

In this way the seventh layer does not fuse if the fifth layer reaches its fusion temperature; this allows the fifth layer to be fixed to the first layer by heating them until a partial fusion is obtained, without the seventh layer being affected by this fusion process.

In a preferred embodiment, the seventh layer is made of polyamide (PA) or polyethylene terephthalate (PET).

In a further advantageous embodiment, the membrane comprises, between the seventh layer and the fifth layer, one or more series of three layers similar (i.e. having the same composition and possibly the same thickness) to the fourth layer, sixth layer and seventh layer, arranged in this order.

In an advantageous embodiment, the third layer and fourth layer are fixed together by a first bonding layer arranged between the two.

Said first bonding layer is preferably made of a thermoplastic material, and/or of a material and in a concentration such that its presence with respect to the total mass of the membrane keeps it recyclable, at least 99%.

Advantageously, the weight percentage of this first bonding layer with respect to the weight of the membrane does not exceed 5%, more preferably does not exceed one percent.

Preferably the first bonding layer is made of polyethylene grafted maleic anhydride.

In a preferred embodiment, the fifth layer is fixed to the layer immediately superimposed on it on the side opposite to the first layer, by means of a second bonding layer.

Said second bonding layer is preferably made of a thermoplastic material, and/or of a material and in a concentration such that its presence with respect to the total mass of the membrane keeps it recyclable, at least 99%.

Advantageously, the weight percentage of this second bonding layer with respect to the weight of the membrane does not exceed 5%, more preferably does not exceed one percent.

Preferably the second bonding layer is made of polyethylene grafted maleic anhydride.

Advantageously, the membrane comprises an adherence layer associated with the second layer and adapted to be positioned, when the membrane is installed, between the second layer and a concrete structure cast on the membrane, so as to increase the adhesion of the concrete structure, once solidified, with the membrane.

In an advantageous embodiment, the adherence layer is fixed directly to the second layer.

In a further advantageous embodiment, the membrane can comprise, between the adherence layer and the second layer, a further layer made of thermoplastic polymeric material, impermeable or substantially impermeable to water, with the function of additional thermal and/or mechanical protection for the second layer.

Preferably, this further layer has a composition similar to the first layer.

Preferably, the adherence layer comprises an adhesive and/or granules and/or a mesh and/or a non-woven fabric, adapted to promote the adhesion of the concrete, during its solidification, to the adherence layer.

More preferably, the adherence layer has a thickness comprised between 0.3 mm to 5.5 mm, even more preferably between 0.5 and 5 mm.

In a further advantageous embodiment, the membrane comprises a drainage layer fixed to the first layer on the opposite side of the second layer, and adapted to be positioned, when the membrane is installed, in contact with the wall of a seat obtained in the ground, to drain possible liquids present in the seat.

Preferably, the drainage layer comprises a bulged membrane of high density polyethylene (HDPE), more preferably coupled to a layer of non-woven fabric (indicated with the abbreviation tnt), preferably of polypropylene.

In a further advantageous embodiment, the drainage layer has a thickness comprised between 0.2 mm and 0.8 mm, preferably 0.5 mm.

Advantageously, the drainage layer comprises bulges.

Preferably, the bulges have a height comprised between 1 mm and 5 mm, preferably 3 mm.

In a further advantageous embodiment, the first layer comprises or is an anti-pressure layer adapted to be positioned, when the membrane is installed, in contact with the wall of a seat formed in the ground, to reduce the pressure on the membrane of possible liquid escaping from the wall.

Preferably, in the event that the first layer comprises or is an anti-pressure layer, the same comprises bulges.

Among the bulges, channels are advantageously defined which allow possible water, which impacts the anti-pressure layer perpendicularly to the lying plane of the membrane, to flow in a direction parallel to the lying plane of the membrane, thus reducing the pressure of water on the membrane itself. Advantageously, in this case, the first layer can be associated with a protective layer, preferably in non-woven fabric (tnt), fixed to the free end of the bulges, and having the function of filtering the water, and preventing the ground from entering in the channels defined between the bulges, occluding them.

Advantageously, the bulges have a height comprised between 3 mm and 20 mm, preferably between 5 mm and 8 mm.

Preferably, the bulges have a concentration comprised between 1200 and 24000 bulges per square meter.

Preferably the first layer, in the event that it comprises or is an anti-pressure layer, has a thickness comprised between 0.4 mm and 1 mm.

Advantageously, the first layer, in the event that it comprises or is an anti-pressure layer, is made of polyethylene.

In an advantageous embodiment, in the event that the first layer is an anti-pressure layer, and comprises the aforementioned bulges, the second layer fixed to said first layer, adapting to the bulged conformation of the latter, can assume a bulged or substantially bulged configuration.

In a further advantageous embodiment, the membrane comprises a further layer, fixed to the second layer on the opposite side of the first layer, adapted to mechanically protect said second layer.

Preferably, this further layer is made of non-woven fabric (tnt), preferably of polypropylene.

The features and advantages of the present invention will be more apparent from the following description, which is to be understood as exemplifying and not limiting, with reference to the appended schematic drawings, wherein:

FIG. 2 is a schematic side elevation view of a portion of the membrane of FIG. 1;

FIG. 3 is a schematic side elevation view of a portion of a second embodiment of a membrane according to the invention;

FIG. 4 is a schematic side elevation view of a portion of a third embodiment of a membrane according to the invention;

FIG. 5 is a schematic side elevation view of a portion of a first embodiment of the second layer of a membrane according to the invention;

FIG. 6 is a schematic side elevation view of a portion of a second embodiment of the second layer of a membrane according to the invention;

FIG. 7 is a schematic side elevation view of a portion of a fourth embodiment of a membrane according to the invention;

FIG. 8 is a schematic side elevation view of a portion of a fifth embodiment of a membrane according to the invention;

FIG. 9 is a schematic side elevation view of a portion of a sixth embodiment of a membrane according to the invention;

FIG. 10 is a schematic side elevation view of a portion of the membrane of FIG. 7 installed according to a first laying method;

FIG. 11 is a schematic side elevation view of a portion of the membrane of FIG. 1 installed according to a second laying method.

Figure 1:
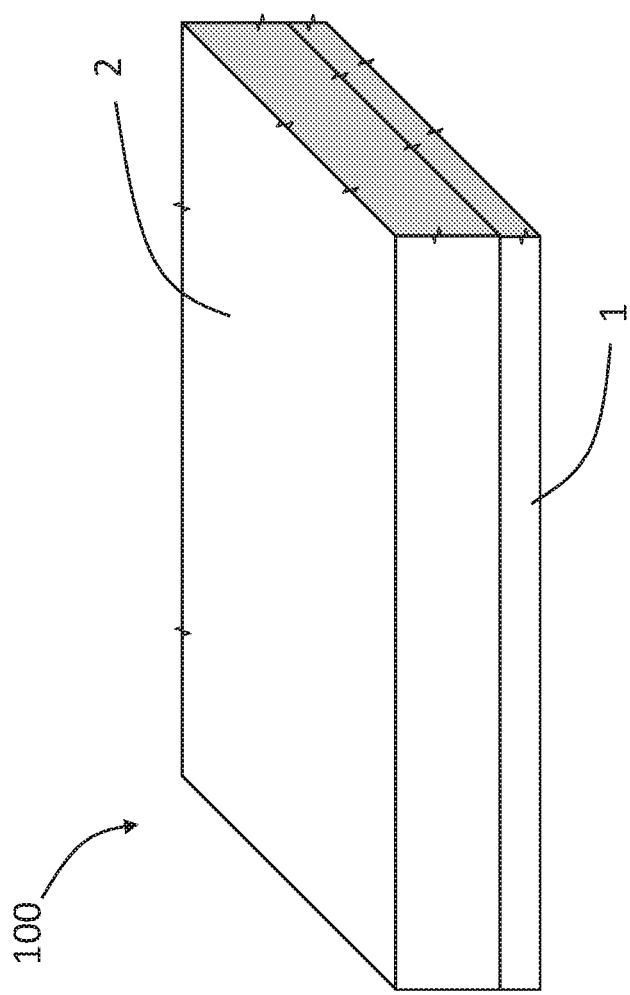
FIG. 1 is a schematic perspective view of a portion of a first embodiment of a membrane according to the invention.

With reference to the appended Figures, the number 1 generally indicates a multilayer membrane for construction, adapted to be installed between a wall 8a of a seat 8 obtained in the ground 9 and a concrete structure 5.

The concrete structure 5 can be, for example, a building, a containment pit for a hydrocarbon tank, the tank of a landfill, etc.

As will be better explained below, the membrane 100 according to the invention, depending on the variant embodiments, is suitable for being used both to laterally cover the base of a pre-formed concrete structure 5, before burying this base, as shown for example in FIG. 11, and as a base on which to cast the concrete which will constitute, once solidified, the base of a structure 5, as shown for example in FIG. 10.

Advantageously, the membrane 100 comprises a first layer 1 of thermoplastic polymeric material, impermeable or substantially impermeable to water, and a second layer 2 of thermoplastic polymeric material, impermeable or substantially impermeable to methane gas and/or radon gas and/or volatile organic compounds (VOC), fixed to the first layer 1 and adapted to be positioned, when installed, between the first layer 1 and a concrete structure 5.

Preferably, the second layer 2 has a thickness comprised between 0.05 mm and 0.3 mm.

Preferably, the first layer 1 and the second layer 2 are made, at least at their contact surfaces, of the same material, or of materials whose chemical composition allows its union by fusion.

Advantageously, the second layer 2 can be fixed to the first layer 1 before it has completely cooled down, so that there is at least a partial fusion of the contact surfaces between the two.

Advantageously, the first layer 1 and the second layer are made, at least at their contact surfaces, of materials having substantially the same fusion temperature, so as to facilitate their union by fusion.

Preferably, the first layer 1 is made of polyethylene (PE) or polyolefin mixtures.

Preferably, the first layer 1 has a thickness comprised between 0.5 mm and 2 mm.

Advantageously, the second layer 2 has a permeability to methane gas lower than 40 $cm^3/(24\ h*m^2*atm)$ and/or a permeability to radon gas lower than 10 $cm^3/(24\ h*m^2*atm)$.

In a preferred embodiment, the second layer 2 has a multilayer structure, and comprises:
- a third layer $2^{III}$ of thermoplastic polymeric material impermeable or substantially impermeable to water;
- a fourth layer $2^{IV}$ of thermoplastic polymeric material impermeable or substantially impermeable to methane gas and/or to radon gas and/or volatile organic compounds (VOC), positioned between the third layer $2^{III}$ and the first layer 1;
- a fifth layer $2^{V}$ of thermoplastic polymeric material impermeable or substantially impermeable to water, positioned between the fourth layer $2^{IV}$ and the first layer 1.

Advantageously, the fifth layer $2^{V}$ is fixed directly to the first layer 1.

Preferably, the fifth layer $2^{V}$ is made of the same material as the first layer 1 or of a material whose composition allows its union by fusion with the first layer 1.

Advantageously, the fifth layer $2^{V}$ is made of a material having substantially the same fusion temperature as the first layer 1.

Preferably, the fifth layer $2^{V}$ is fixed to the first layer 1 by, at least partial, fusion of the fifth layer $2^{V}$ and the first layer 1.

Preferably, the third layer $2^{III}$ is made of polyethylene (PE).

Preferably, the fourth layer $2^{IV}$ is made of polyamide (PA), or polyethylene terephthalate (PET), or polyvinyl ethylene-alcohol (EVOH).

Preferably, the fifth layer $2^{V}$ is made of low density polyethylene (LDPE), or linear low density polyethylene (LLDPE), or high density polyethylene (HDPE).

Preferably, the third layer $2^{III}$ has a thickness comprised between 0.020 and 0.145 mm.

Advantageously, the fourth layer $2^{IV}$ has a fusion temperature higher than that of the fifth layer $2^{V}$.

Advantageously, the fourth layer $2^{IV}$ has a fusion temperature higher than 135° C., and preferably comprised between 160° C. and 200° C., more preferably comprised between 165° C. and 191° C.

Preferably, the fifth layer $2^{V}$ has a thickness comprised between 0.020 and 0.145 mm.

Advantageously, the fifth layer $2^{V}$ has a fusion temperature from 100° C. to 135° C.

Advantageously, as shown for example in FIG. 6, the second layer 2 can comprise a sixth layer $2^{VI}$ of thermoplastic polymeric material impermeable or substantially impermeable to methane gas and/or radon gas and/or volatile organic compounds (VOC), interposed between the fourth layer $2^{IV}$ and the fifth layer $2^{V}$.

Advantageously, the sixth layer $2^{VI}$ is made of polyvinyl ethylene-alcohol (EVOH).

Preferably, the sixth layer $2^{VI}$ has a thickness comprised between 0.003 mm and 0.006 mm.

Preferably, as shown for example in FIG. 6, the second layer 2 can comprise a seventh layer $2^{VII}$ of thermoplastic polymeric material impermeable or substantially impermeable to methane gas and/or radon gas and/or volatile organic compounds (VOC), interposed between the sixth layer $2^{VI}$ and the fifth layer $2^{V}$.

Advantageously, the seventh layer $2^{VII}$ has a fusion temperature higher than that of the fifth layer $2^{V}$.

Preferably the seventh layer $2^{VII}$ has the same composition as the fourth layer $2^{IV}$.

Preferably, the seventh layer $2^{VII}$ is made of polyamide (PA), or polyethylene terephthalate (PET).

In a further advantageous embodiment, not shown, the membrane 100 can comprise, between the seventh layer $2^{VII}$ and the fifth layer $2^{V}$, one or more series of three layers similar (i.e. having the same composition and possibly the same thickness) to the fourth layer sixth layer 2VI and seventh layer $2^{VII}$, arranged in this order.

In an advantageous embodiment, the third layer $2^{III}$ and the fourth layer $2^{IV}$ are fixed together by a first bonding layer $2^{inc1}$ arranged between the two.

Said first bonding layer is preferably made of a thermoplastic material, and/or of a material and in a concentration such that its presence with respect to the total mass of the membrane keeps it recyclable, at least 99%.

Advantageously, the weight percentage of this first bonding layer $2^{inc1}$ with respect to the weight of the membrane does not exceed 5%, more preferably does not exceed one percent.

Preferably the first bonding layer $2^{inc1}$ is made of polyethylene (PE) grafted maleic anhydride.

In a preferred embodiment, the fifth layer $2^{V}$ is fixed to the layer immediately superimposed on it (for example the layer $2^{VII}$ in the example of FIG. 6) on the side opposite to the first layer 1, by means of a second bonding layer $2^{inc2}$.

Said second bonding layer $2^{inc2}$ is preferably made of a thermoplastic material, and/or of a material and in a concentration such that its presence with respect to the total mass of the membrane keeps it recyclable, at least 99%.

Advantageously, the weight percentage of this second bonding layer $2^{inc2}$ with respect to the weight of the membrane does not exceed 5%, more preferably does not exceed one percent.

Preferably the second bonding layer $2^{inc2}$ is made of polyethylene (PE) grafted maleic anhydride.

In an advantageous embodiment, such as for example the embodiments shown in FIGS. 7 to 10, the membrane 100 comprises an adherence layer 4 associated with the second layer 2 and adapted to be positioned, when installed, between the second layer 2 and a concrete structure 5 to increase the adhesion of the membrane 100 to the concrete structure 5. As shown for example in FIG. 10, in this embodiment the membrane 100 lends itself to being positioned, for example, on a bottom wall 8a and possibly also on the side wall(s) of a seat dug into the ground 9, before pouring a concrete casting on it which will constitute, once solidified, the base of a structure 5.

The adherence layer 4 binds or is constrained with the concrete and, once the latter has solidified, the membrane 100 remains fixed externally to the same, isolating the base of the structure 5 from the ground 9.

Advantageously, the adherence layer 4 comprises an adhesive and/or granules and/or a mesh and/or a non-woven fabric, adapted to promote the adhesion of the concrete, during its solidification, to the adherence layer 4.

Preferably, the adherence layer 4 has a thickness comprised between 0.3 mm to 5.5 mm, more preferably between 0.5 and 5 mm.

In an advantageous embodiment, the adherence layer 4 is fixed directly to the second layer 2.

In a further advantageous embodiment, the membrane 100 can comprise, between the adherence layer 4 and the second layer 2, a further layer, not shown, made of thermoplastic polymeric material, impermeable or substantially impermeable to water, with the function of additional thermal and/or mechanical protection for the second layer 2.

Preferably, this further layer has a composition similar to the first layer 1.

In an advantageous embodiment, such as for example those shown in FIGS. 3 and 8, the membrane 100 comprises a drainage layer 6 fixed to the first layer 1 on the opposite side of the second layer 2, and adapted to be positioned, when installed, in contact with the wall 8a of a seat 8 obtained in the ground 9, to drain possible liquids present in the seat 8.

The drainage layer 6 contributes to distribute possible water present in the ground in a direction parallel to the lying plane of the membrane 100, thus avoiding localized water concentrations which could cause high pressures in some points of the membrane 100, with the risk of damaging it.

Preferably, the drainage layer 6 comprises a membrane 6a, preferably bulged, advantageously of high density polyethylene (HDPE), more preferably coupled to a layer 6b of non-woven fabric (tnt) of polypropylene.

Advantageously, the drainage layer has a thickness comprised between 0.2 mm and 0.8 mm, preferably 0.5 mm.

Preferably, the drainage layer comprises bulges; more preferably, the bulges have a height comprised between 1 mm and 5 mm, preferably 3 mm.

In an advantageous embodiment, such as for example those shown in FIGS. 4 and 9, the first layer 1 can comprise or be an anti-pressure layer adapted to be positioned, when installed, in contact with a wall 8a of a seat 8 obtained in the ground 9, to reduce the pressure on the membrane 100 of possible liquid escaping from said wall 8a, and which could damage the membrane 100.

Advantageously, the first layer, in the event that it comprises or is an anti-pressure layer, comprises bulges 7a; preferably these bulges have a height comprised between 5 mm and 20 mm, preferably between 5 mm and 8 mm.

Advantageously, said bulges have a concentration comprised between 1200 and 24000 bulges per square meter.

Among the bulges 7a, channels 7b are defined which allow possible water, which impacts the anti-pressure layer perpendicularly to the lying plane of the membrane 100, to flow in a direction parallel to the lying plane of the membrane 100, thus reducing the pressure of water on the membrane 100 itself.

Advantageously, in this case, the first layer 1 can be associated with a protective layer, not shown, preferably made of non-woven fabric (tnt), fixed to the free end of the bulges 7a, and having the function of filtering the water, and preventing the ground from entering in the channels 7b defined between the bulges 7a, occluding them.

Preferably the first layer 1, in the event that it comprises or is an anti-pressure layer, has a thickness comprised between 0.4 mm and 1 mm.

Advantageously, the first layer 1, in the event that it comprises or is an anti-pressure layer, is made of polyethylene (PE).

In an advantageous embodiment, as for example in the embodiments of FIGS. 4 and 9, in the event that the first layer 1 comprises or is an anti-pressure layer, and comprises aforementioned bulges 7a, the second layer 2 fixed to said first layer 1, adapting to the bulged conformation of the latter, can assume a bulged or substantially bulged configuration.

The use of the membrane 100 according to the invention is as follows.

With reference to FIG. 11, the membrane 100 can be positioned around the base of a concrete structure 5 already formed and positioned in a seat 8 obtained in the ground 9, before burying this base.

The membrane 100 is therefore interposed between the wall 8a of the seat 8 and the concrete structure 5, thus preventing water, methane and/or radon and/or volatile organic compounds present in the ground from reaching the side surface of the base of the structure 5.

In a further advantageous embodiment, not shown in the appended figures, the membrane 100 can also be positioned on a bottom wall of a seat 8 formed in the ground before positioning an already formed concrete structure 5 on this membrane; in this case, a membrane 100 can optionally be advantageously positioned also around the base of this already formed concrete structure 5, so as to be interposed between the side wall of the seat 8 and the concrete structure 5.

In the variant embodiments in which the membrane 100 is provided with the adherence layer 4, the same can also be used as shown for example in FIG. 10, i.e. it can be positioned on the bottom wall 8a, and possibly also on the side wall(s) 8a of a seat 8 dug in the ground 9, before pouring a concrete casting on it which will constitute, once solidified, the base of a structure 5. The adherence layer 4 binds or is constrained with the concrete and, once the latter has solidified, the membrane 100 remains fixed externally to the same, isolating the base of the structure 5 from the ground 9.

It should be noted that in this case the membrane 100 can be positioned, before the concrete casting, also in a position such as to laterally cover also the base of the concrete structure 5 when it has solidified.

From the above description the features of the membrane of the present invention, as well as the advantages thereof, are evident.

Finally, it is to be understood that the multilayer membrane for construction as conceived herein is susceptible to many modifications and variations, all falling within the invention; furthermore, all the details are replaceable by technically equivalent elements. In practice, the materials used, as well as the dimensions, can be of any type according to the technical requirements.

The invention claimed is:

1. A multilayer membrane suitable for construction, adapted to be installed between a wall of a seat obtained in the ground and a concrete structure, the membrane comprising:
 a first layer comprising thermoplastic polymeric material, impermeable or substantially impermeable to water;
 a second layer comprising thermoplastic polymeric material, impermeable or substantially impermeable to methane gas, fixed to the first layer and adapted to be positioned, when the membrane is installed, between the first layer and a concrete structure, wherein said multilayer membrane further comprises:

a drainage layer comprising a bulged membrane fixed to the first layer on the opposite side of the second layer, and adapted to be positioned, when the membrane is installed, in contact with the wall of a seat obtained in the ground, to drain possible liquids present in the seat, wherein the first layer and the second layer do not comprise bulges and the bulges present in the bulged membrane have a height of from 1 mm to 5 mm, the second layer has a multilayer structure comprising:

a third layer comprising thermoplastic polymeric material impermeable or substantially impermeable to water;

a fourth layer comprising thermoplastic polymeric material impermeable or substantially impermeable to methane gas and/or to radon gas and/or one or more volatile organic compounds, positioned between the third layer and the first layer;

a fifth layer comprising thermoplastic polymeric material impermeable or substantially impermeable to water, positioned between the fourth layer and the first layer;

a sixth layer comprising thermoplastic polymeric material impermeable or substantially impermeable to methane gas and/or to radon gas and/or to one or more volatile organic compounds, interposed between the fourth layer and the fifth layer;

a seventh layer comprising thermoplastic polymeric material impermeable or substantially impermeable to methane gas and/or to radon gas and/or to one or more volatiles organic compounds, interposed between the sixth layer and the fifth layer;

wherein the fourth layer has a melting temperature higher than that of the fifth layer, wherein the fourth layer has a melting temperature higher than 135° C., wherein the fifth layer has a melting temperature comprised between 100° C. and 135° C., wherein the seventh layer has a melting temperature higher than that of the fifth layer, wherein the seventh layer has the same composition as the fourth layer.

2. The membrane of claim 1, wherein said bulged membrane is coupled to a layer of non-woven fabric.

3. The membrane of claim 2, wherein said layer of non-woven fabric is made of polypropylene.

4. The membrane of claim 1, wherein said drainage layer has a thickness comprised between 0.2 mm and 0.8 mm.

5. The membrane of claim 1, wherein the first layer and the second layer are made, at least at their contact surfaces, of the same material, or of materials whose chemical composition allows its union by fusion.

6. The membrane of claim 1, wherein the first layer is made of polyethylene or of a polyolefin mixture.

7. The membrane of claim 1, wherein the second layer has a permeability to methane gas lower than 40 $cm^3/(24\ h*m^2*atm)$ and/or a permeability to radon gas lower than 10 $cm^3/(24\ h*m^2*atm)$.

8. The membrane of claim 1, wherein the fifth layer is fixed directly to the first layer.

9. The membrane of claim 1, wherein the third layer is made of polyethylene.

10. The membrane of claim 1, wherein the fourth layer is made of polyamide, polypropylene, polyethylene terephthalate, or ethylene vinyl alcohol.

11. The membrane of claim 1, wherein the fifth layer is made of low density polyethylene, linear low-density polyethylene, or high-density polyethylene.

12. The membrane of claim 1, wherein the sixth layer is made of ethylene vinyl alcohol.

13. The membrane of claim 1, wherein the seventh layer is made of polyamide or polyethylene terephthalate.

14. The membrane of claim 1, further comprising, between the seventh layer and the fifth layer:

a series of three layers similar to the fourth layer, sixth layer, and seventh layer, arranged in this order.

15. The membrane of claim 1, wherein the third layer and fourth layer are fixed to each other by a first bonding layer arranged between the two layers.

16. The membrane of claim 1, wherein the fifth layer is fixed to the layer immediately superposed on it opposite to the first layer, by a second bonding layer.

17. The membrane of claim 1, wherein said bulged membrane is made of high density polyethylene.

* * * * *